United States Patent [19]

Hegge et al.

[11] Patent Number: 4,624,799

[45] Date of Patent: Nov. 25, 1986

[54] MIXTURE FOR USE IN THE LSC (LIQUID SCINTILLATION COUNTING) ANALYSIS TECHNIQUE

[75] Inventors: Theodorus C. J. M. Hegge, Kloosterburen; Jan ter Wiel, Loppersum, both of Netherlands

[73] Assignee: Packard Instrument B.V., Groningen, Netherlands

[21] Appl. No.: 650,925

[22] Filed: Sep. 14, 1984

[30] Foreign Application Priority Data

Sep. 16, 1983 [NL] Netherlands ............... 8303213

[51] Int. Cl.$^4$ .............................................. C09K 11/06
[52] U.S. Cl. ............................... 252/301.17; 252/700; 252/646; 250/364
[58] Field of Search .................. 252/700, 625, 301.17; 250/364

[56] References Cited

U.S. PATENT DOCUMENTS

| | | | |
|---|---|---|---|
| 3,673,100 | 6/1972 | Benson | 252/301.17 |
| 3,928,227 | 12/1975 | Sena | 250/364 |
| 3,995,033 | 11/1976 | Högberg et al. | 260/941 |
| 4,001,139 | 1/1977 | Long | 252/301.17 |
| 4,423,242 | 12/1983 | Wilkinson et al. | 260/941 |

OTHER PUBLICATIONS

"Difficulties in Counting Emulsions of $^3$H and $^{14}$C Labelled Biomolecules" by James L. O'Conner and Edwin D. Bransome, Jr.

"Effect of Admixtures on the Temperature Instability of Liquid Scintillators" by L. Ya. Zhil'tsova, I. I. Zemskova, E. N. Matveeva and V. G. Tyminskii.

"Polyethoxylated Nonionic Surfactants in Toluene for Liquid Scintillation Counting of Tritium in Aqueous Samples" by S. B. Lupica.

Primary Examiner—John F. Terapane
Assistant Examiner—S. Wolffe
Attorney, Agent, or Firm—Leydig, Voit & Mayer

[57] ABSTRACT

A liquid, homogeneous mixture for use in the LSC (Liquid Scintillation Counting) analysis technique, comprising a scintillation liquid, a scintillator and a surfactant, wherein the surfactant includes one or more phosphoric acid esters having formula 1 and/or formula 2 of the sheet of formulae, in which R', R" and R''' represent an organic group, which phosphor acid esters are neutralized to a pH, at which the neutralization product comprises a mono- and/or diphosphate with an alkaline material having a p$K_a$ of at least 5, and in which of the organic phosphoric acid esters having formula 1, R" and R''' may be the same or different.

7 Claims, 2 Drawing Figures

MIXTURE FOR USE IN THE LSC (LIQUID SCINTILLATION COUNTING) ANALYSIS TECHNIQUE

The invention relates to a mixture for use in the LSC (Liquid Scintillation Counting) analysis technique comprising a scintillation liquid, a scintillator and a surfactant.

The LSC analysis technique is generally known and one of the most applied techniques for the quantitative determination of usually low-energetic radioactivity in inorganic, organic and biological materials.

The possibility of effectively and reproducibly determining in particular soft $\beta$ radiation within the framework of the LSC analysis technique without many preparatory measures is the result of a development which started some decades ago.

In the LSC analysis technique the radioisotope to be determined is to be brought into close contact with the scintillator molecules. Consequently, many researches have been conducted into mixtures suitable for this purpose, in which the determination can be carried out, both at homogeneous and heterogeneous counting samples.

The majority of the known LSC mixtures is satisfactory when used with water or with materials containing diluted salts.

It is a drawback of the known materials, however, that their general usability is limited. For instance, there are limits to the possibility of involving concentrated aqueous salt solutions in the determination, unless there are developed special products therefor or there is diluted with water, which has the drawback that many preparatory measures must be taken.

It is another disadvantage of the known LSC mixtures, when they are used in the presence of strongly alkaline samples, e.g., samples comprising 2M sodium hydroxide or quaternary ammonium hydroxide solutions is formed by the occurrence of prolonged background noise owing to chemiluminescence. In practice, the solution of this problem has been sought in the composition of LSC mixtures, the action of which is based on the principle of acidifying. This, however, has the important disadvantage of a strongly reduced counting efficiency.

The object of the invention is therefore to provide an improved mixture for carrying out the LSC analysis technique in it, which does not show the disadvantages of the known mixtures and can be used directly and universally without or with taking only a few preparatory measures.

Figure 1:
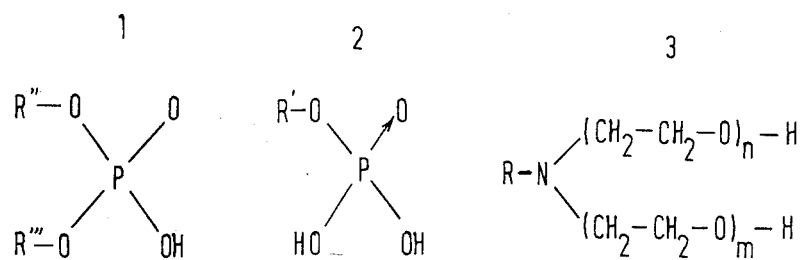
FIGS. 1 and 2 show the changes in absorption capacity for different scintillation solutions.
Figure 1:
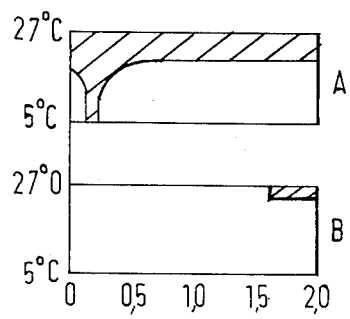

According to the invention there is provided for this purpose a mixture of the type set forth in the first paragraph, which is characterized in that said mixture includes one or more inorganic phosphoric acid esters having formula 1 and/or 2 of the sheet of formulae, in which R', R" and R''' represent an organic group, which phosphoric acid esters are neutralized to a pH, at which the neutralization product comprises a mono- and/or diphosphate with alkaline material having a $pK_a$ of at least 5, and in which of the organic phosphoric acid esters having formula 1, R" and R''' may be the same or different.

The neutralization of the phosphoric acid ester requires the use of an alkaline material having a $pK_a$ value sufficiently great to enable proton absorption, and which is therefore at least 5 according to the invention. The upper limit of the $pK_a$ value has proved to be less critical. Also when a strong base is used, e.g. potassium hydroxide, as a neutralizing agent, it has surprisingly been found that an improved usability of the LSC mixture is obtained. This means a reduced chemiluminescence when LSC determination is carried out with the occurrence of conditions favouring chemiluminescence, as well as an improved compatibility with strongly concentrated salt solutions.

It is preferred, however, when, within the framework of the invention, the neutralization of the phosphoric acid ester is effected by using an alkaline material having a $pK_a$ value, or in case of polyacidic alkaline materials the maximum $pK_a$ value, of 12 to 5. The incorporation of phosphoric acid ester neutralized with such an alkaline material, e.g., ammonia, into an LSC mixture according to the invention will result in a reduction of the chemiluminescence, within the framework of an LSC determination, in case of addition of a strongly alkaline solution or of a quaternary hydroxide solution to the LSC mixture, while an improvement in the compatibility with strongly concentrated salt solutions can also be observed. In combination, these advantageous properties occur to a higher degree if the phosphoric acid ester is neutralized by an organic amine as the alkaline material, so that the use of such a compound is especially preferred.

In formula 1 and formula 2 of the sheet of formulae R', R" and R''' may represent an alkyl, aryl, alkoxylated alkyl or alkoxylated alkyl phenyl group, in which of the organic phosphoric acid ester having formula 1 of the sheet of formulae R" and R''' may be the same or different. The alkyl group may be, e.g., methyl, butyl, octyl or cycloalkyl, the aryl group, e.g., phenyl; the alkoxylated alkyl group may be a group having the formula $C_nH_{2n+1}O-(CH_2-CH_2-O)_m-H$, in which n and m are integers and in which an appropriate group of this type is, e.g., the one in which $n=12$ and $m=6$. For instance, the alkoxylated alkyl phenyl group may have the formula $C_nH_{2n+1}-C_6H_4-O-(CH_2-CH_2-O)_m-H$, in which n and m likewise represent integers.

When an amine is used for neutralization of the organic phosphoric acid esters, compounds are suitable having the formula $R_1-NH_2$, in which $R_1=$alkyl, e.g., methyl, butyl, benzyl; compounds having the formula $R_1R_2-NH$, in which $R_1$ and $R_2$ may be the same or different and as defined above, e.g., $(CH_3)_2N-C_{12}H_{25}$ or $N(C_4H_9)_3$; a diamine having the formula $R_1R_2N-(CH_2)_n-NR_3R_4$ in which $R_1$, $R_2$, $R_3$ and $R_4$ may be the same or different and as defined above, and n represents an integer, e.g., aminooctane $NH_2-(CH_2-)_8-NH_2$; a cyclic amine, e.g., Dabco, morpholine or substituted morpholine, and an ethoxylated amine, e.g., the compound having formule 3 of the sheet of formulae.

For the neutralization of the organic phosphoric acid ester there may also be used an aromatic amine in which the amino group is substituted direct to the aromatic ring, of course with the proviso that the $pK_a$ value satisfies the pertinent requirement of the invention. For instance, o-toluidine having $pK_a=4.4$ is not suitable for the contemplated object, but 2-aminopyridine having $pK_a=6.81$ is suitable indeed.

In the neutralization of a phosphoric acid ester with an alkaline material, e.g., an organic amine, to obtain a phosphoric acid ester to be used according to the invention, the neutralization curve of phosphoric acid will in general be followed. The neutralization is continued until a pH value, at which the neutralization product comprises a mono- and/or diphosphate. Measured as a 1% solution or dispersion in water the pH is then approximately 4–8.

According to the invention the resulting products may be incorporated into the known LSC mixtures.

The invention is illustrated by the following examples.

EXAMPLE I

Determination of the reduction of chemiluminescence when a neutralized phosphoric acid ester is incorporated into a mixture comprising an alkylphenol ethoxylate, to which an alkaline solution was added.

Two mixtures were compared: mixture A: 55 cm$^3$ of xylene and 40 g of ethoxylated nonylphenol—average 9 moles of ethylene oxide—; 0.64 g of PPO (diphenyloxazole) and 0.06 g of bis—MSB (1.4-bis-(0-methylstyryl/-benzene); mixture B: 55 cm$^3$ of xylene and 30 g of ethoxylated and nonylphenol—average 9 moles of ethylene oxide—; 10 g of mono-diphosphoric acid ester of an ethoxylated nonylphenol—average 7 moles of ethylene oxide—, neutralized with 4.2 cm$^3$ of KOH solution (approximately 4M) up to pH 7.0 and 0.64 g of PPO and 0.06 g of bis—MSB.

At each of the samples of 10 cm$^3$ a measurement was carried out for 2 minutes by using a Tricarb 3380 LCS counting device. There was added 1 cm$^3$ of a quaternary ammonium hydroxide solution (approximately 0.60N) to each of the samples. The standard background noise of the counting device was 25–35 counts/min.

| Background after min. | mixture A | mixture B |
| --- | --- | --- |
| 3 | 1.25 × 10$^7$ | 1982 |
| 33 | 8 × 10$^4$ | 211 |
| 66 | 22778 | 70 |
| 132 | 7700 | 44 |

There could also be observed an improved absorption capacity for a 2M NaCl solution; see the graphic representation in the drawing (FIG. 1). In it, the number of cm$^3$ of the 2M NaCl solution added to 10 cm$^3$ of mixture is plotted on the X axis. The hatched area indicates an unserviceable area in which a precipitate is formed. In FIG. 1, designations A and B relate to mixture A and mixture B, respectively.

EXAMPLE II

Determination of the reduction of chemiluminescence in an LSC mixture based on toluene.

The background noise was determined by means of a TriCarb 3380.

Two mixtures were prepared, namely, mixture A from 50 cm$^3$ of toluene+scintillator Permablend III in an amount of 5 g/l of mixture, which means, per liter of mixture, 4.55 g of PPO (diphenyl oxazole) and 0.45 g bis—MSB (1,4-bis-(0-methylstyryl)benzene); and mixture B, comprising 50 cm$^3$ of toluene, 5.32 g of mono-di-2-ethyl-hexyl-phosphoric acid; 3.7 g of tributylamine+-scintillator Permablend III in an amount of 5 g/l of mixture, which means, per liter of mixture, 4.55 g of PPO and 0.45 g of bis—MSB.

Measurement gave the following results.

| Background noise after: | mixture A, counts/min. | mixture B, counts/min. |
| --- | --- | --- |
| 3 min. | 6183 | 112 |
| 6 min. | 1210 | 70 |
| 9 min. | 559 | 40 |
| 12 min. | 337 | ≦ST |
| 27 min. | 125 | ≦ST |
| 30 min. | 115 | ≦ST |

ST=standard background=30–40 counts/min.

EXAMPLE III

Determination of the reduction of chemiluminescence when an neutralized phosphoric acid ester is incorporated into a mixture containing alkylphenol ethoxylate, to which an alkaline solution was added.

Two mixtures were compared:

mixture A, comprising 55 g of ethoxylated nonylphenol—average 9 moles of ethylene oxide—, supplemented to 200 cm$^3$ with xylene+1 g of Permablend III: (0.91 g of PPO+0.09 g of bis—MSB);

mixture B, comprising 50 g of ethoxylated nonylphenol—average 9 moles of ethylene oxide—, 9.02 g of ethoxylated fatty alcohol phosphate (MARLOPHOR FC of Chemische Werke Hüls) and 1.22 g of Dabco (1,4-diaza-bicyclo(2,2,2)octane), supplemented to 200 cm$^3$ of xylene+1 g Permablend III: 0.91 g of PPO+0.09 of bis—MSB).

At each of the samples a measurement was carried out for 2 minutes by using a Tricarb 3380 LSC counting device. There was added 1 cm$^3$ of the samples listed in the following table to 10 cm$^3$ of the LSC mixture. The background noise of the counting device was 25–35 counts/min.

| Background after | mixture A counts/min. | mixture B counts/min. | sample |
| --- | --- | --- | --- |
| 3 min. | 3 × 10$^3$ | 86 | 1 cm$^3$ of hyamine |
| 36 min. | 295 | 45 | hydroxide solution |
| 69 min. | 152 | 31 | approximately 1 N |
| 3 min. | 1.3 × 10$^4$ | 65 | 1 cm$^3$ of quaternary |
| 36 min. | 1.2 × 10$^3$ | 26 | ammonium hydroxide solution, approximately 0.55 N |
| 3 min. | 193.5 | 155 | 1 cm$^3$ of 0.5 N |
| 36 min. | 144.5 | 26 | sodium hydroxide solution |

Counting measurements made by using a TriCarb 3380 Liquid Scintillation Spectrometer, which was adjusted to conditions for optimum tritium measurement, gave the following results (the counting device with which the measurements were carried out was capable of counting a sealed unquenched standard for tritium at about 50.6% efficiency. There was injected 8 μl of tritiated toluene corresponding to a value of 14,518 ppm in the samples. The determination was carried out in triplicate):

There was found for mixture A: 5871 counts/min., corresponding to an absolute tritium counting efficiency of 40.4%;

mixture B: 5450 counts/min., corresponding to an absolute tritium counting efficiency of 37.5%.

EXAMPLE IV:

Determination of the improvement in the absorption capacity of highly concentrated salt solutions.

Measurements were carried out at three mixtures:

mixture A: 55 g of nonylphenol ethoxylate—average 9 moles of ethylene oxide—, supplemented to 200 cm³ with xylene;

mixture B: 2.66 g of mono-di-2-ethylhexyl phosphoric acid ester, 0.3 g of ethylene diamine, 50 g of nonylphenol ethoxylate—average 9 moles of ethylene oxide—supplemented to 200 cm³ with xylene, mixture C: as mixture B, but with 8.8 g of ethoxylated fatty alcohol ester of phosphoric acid (MARLOPHOR FC of Chemische Werke Hüls) and 0.3 g of ethylene diamine.

Figure 2:
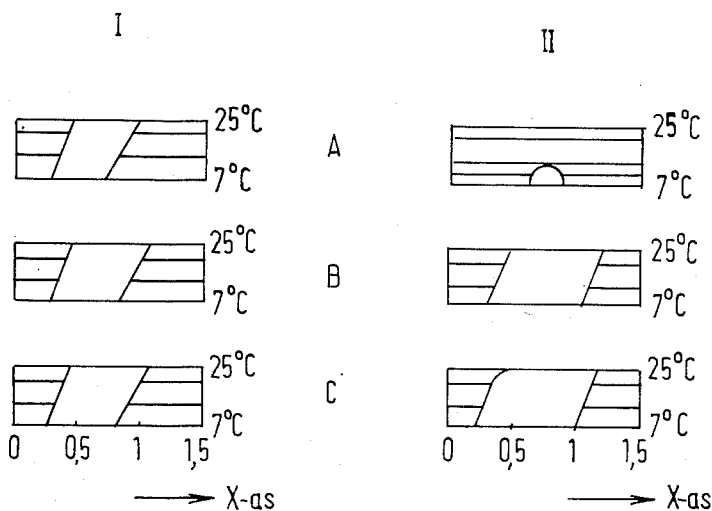

The changes that could be observed with respect to the absorption capacity for a 0.15M NaCl— solution and a 0.5M NaCl solution have been graphically represented in the drawing (FIG. 2). In it, series I represents the observations in case of addition of 0; 0.5; 1 and 1.5 cm³ (X axis) of the 0.15M NaCl solution to 10 cm³ of mixture A, B or C, and series II represents the observations in case of addition of 0; 0.5; 1 and 1.5 cm³ of the 0.5M NaCl solution. Especially series II shows a substantial improvement in the absorption capacity for salt solutions.

EXAMPLE V

Improvement in the action of an LSC mixture according to O'Connor and Bransome (L.S.C., Recent Application and Developments, ed. C. T. Peng et al, 2, 245-257, 1980).

Measurements were carried out at the following mixtures: mixture A, comprising 90 g of Triton X-100 (Rohm & Haas); 30 g Aerosol MA 80 (Cyanamid) and 280 cm³ of toluene; mixture B, comprising 19.2 g of alkyl phosphoric acid ester of an ethoxylated fatty alcohol (MARLOPHOR ND of Chemische Werke Hüls); 5.2 g of dimethyl cyclohexylamine and 40 cm³ of toluene. Measurements of the background noise in case of addition of 1 cm³ of 0.2M sodium hydroxide solution to 10 cm³ of scintillator mixture are given in the following table.

| Background after | mixture A counts/min. | 8 parts of mixture A 2 parts of mixture B counts/min. |
|---|---|---|
| 3 min. | 196.5 | 43.5 |
| 6 min. | 73 | 28 |
| 9 min. | 74 | 24 |
| 30 min. | 39 | 24 |

We claim:

1. A liquid, homogenous mixture for use in liquid scintillation counting analysis techniques, said mixtures comprising a scintillation liquid, a scintillator and a surfactant wherein the improvement comprises a surfactant comprising one or more neutralized mono- or diphosphate esters, said esters being the reaction product of one or more phosphoric acid esters having the formula

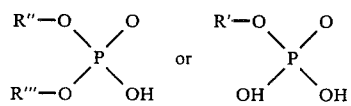

wherein R', R" and R'" represent organic groups selected from the group consisting of alkyl, aryl, alkoxylated alkyl or alkoxylated alkyl phenyl and R" and R'" may be the same or different; and an alkaline material having a $pK_a$ of at least 5.

2. A mixture according to claim 1, wherein the alkaline material has a $pK_a$ value of 12 to 5.

3. The composition of claim 2, wherein the alkaline material is an organic amine.

4. A mixture according to claim 3, wherein said organic amine is a compound having the formula $R_1$—$NH_2$, in which $R_1$ represents alkyl, cycloalkyl, alkoxy alkyl or alkanol; a compound having the formula $R_1R_2$—NH, in which $R_1$ or $R_2$ may be the same or different and as defined above, a compound having the formula $R_1R_2R_3N$, in which $R_1$, $R_2$ and $R_3$ may be the same or different and as defined above; a diamine having the formula $R_1R_2N$—$(CH_2)_n$—$NR_3R_4$ in which $R_1$, $R_2$, $R_3$ and $R_4$ may be the same or different and as defined above, and n represents an integer; a cyclic amine or an ethoxylated amine.

5. A mixture according to claim 1, wherein of the organic phosphoric acid ester having formula 1 or formula 2 of the sheet of formulae R', R" and R'" represent an alkyl-, aryl-, alkoxy-substituted alkyl- or alkoxy-substituted aryl group.

6. The composition of claims 2, 4, 1 or 3 wherein the amount of neutralized organic acid ester is about 0.1% to greater than 40% by weight.

7. The composition of claim 5 wherein the amount of neutralized organic acid ester is about 1% to about 20% by weight.

* * * * *